(12) United States Patent
Minois et al.

(10) Patent No.: US 9,500,828 B2
(45) Date of Patent: Nov. 22, 2016

(54) PIPE-CONFORMING STRUCTURE

(71) Applicants: Antoine Minois, Houston, TX (US); Mohan G. Kulkarni, The Woodlands, TX (US); James E. Elliott, Arlington, TX (US); Michael S. Weir, Spring, TX (US); Wentao Cheng, Cypress, TX (US); Adam J. Rinehart, The Woodlands, TX (US)

(72) Inventors: Antoine Minois, Houston, TX (US); Mohan G. Kulkarni, The Woodlands, TX (US); James E. Elliott, Arlington, TX (US); Michael S. Weir, Spring, TX (US); Wentao Cheng, Cypress, TX (US); Adam J. Rinehart, The Woodlands, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 0 days.

(21) Appl. No.: 14/738,457

(22) Filed: Jun. 12, 2015

(65) Prior Publication Data
US 2015/0378120 A1    Dec. 31, 2015

Related U.S. Application Data

(60) Provisional application No. 62/019,313, filed on Jun. 30, 2014.

(51) Int. Cl.
| | |
|---|---|
| *G02B 6/44* | (2006.01) |
| *B29C 63/22* | (2006.01) |
| *F16L 55/18* | (2006.01) |
| *G02B 6/46* | (2006.01) |
| *B29L 11/00* | (2006.01) |
| *B29C 47/02* | (2006.01) |

(52) U.S. Cl.
CPC ............ *G02B 6/4427* (2013.01); *B29C 63/22* (2013.01); *F16L 55/18* (2013.01); *G02B 6/4416* (2013.01); *G02B 6/4429* (2013.01); *G02B 6/4463* (2013.01); *G02B 6/4479* (2013.01); *G02B 6/46* (2013.01); *B29C 47/021* (2013.01); *B29L 2011/0075* (2013.01); *G02B 6/44* (2013.01)

(58) Field of Classification Search
CPC .... G02B 6/4427; G02B 6/46; G02B 6/4429; G02B 6/4416; G02B 6/4479; G02B 6/4463; G02B 6/44; B29C 63/22; B29C 47/021; F16L 55/18; B29L 2011/0075
See application file for complete search history.

(56) References Cited

U.S. PATENT DOCUMENTS

| | | | |
|---|---|---|---|
| 4,756,303 | A | 7/1988 | Kawashima et al. |
| 6,446,723 | B1 | 9/2002 | Ramos et al. |
| 6,449,412 | B1 | 9/2002 | Rutterman et al. |
| 6,507,686 | B1 | 1/2003 | Heinz et al. |
| 6,836,603 | B1 | 12/2004 | Bocanegra et al. |
| 7,004,681 | B2 * | 2/2006 | Penza ............... E03F 3/04 405/183.5 |

(Continued)

FOREIGN PATENT DOCUMENTS

| | | | |
|---|---|---|---|
| EP | 1 262 809 | 12/2002 | |
| GB | WO 2013045882 A2 * | 4/2013 | ............ E21B 47/01 |
| WO | WO 02/103854 | 12/2002 | |
| WO | WO 2013/045882 | 4/2013 | |

*Primary Examiner* — Ryan Lepisto
(74) *Attorney, Agent, or Firm* — ExxonMobil Upstream Research Company—Law Department

(57) ABSTRACT

The present techniques are directed to systems and methods for forming a pipe-conforming structure. The pipe-conforming structure includes a polymer material and one or more optic fibers embedded within the polymer material. The polymer material is formed into a structure that is conformed to the shape of a pipe. A method includes forming a polymer material into a structure including an edge region and a center region. The center region has a greater thickness than the edge region. The method includes inserting one or more optic fibers into the polymer material.

20 Claims, 6 Drawing Sheets

(56) References Cited

U.S. PATENT DOCUMENTS 7,406,232 B2 7/2008 Stingl et al.
8,538,216 B2 9/2013 Abernathy et al.
2008/0006337 A1* 1/2008 Quigley .................... F16L 9/19
138/125
2011/0044697 A1* 2/2011 Peter .................... H04B 10/801
398/140

* cited by examiner

PIPE-CONFORMING STRUCTURE

CROSS-REFERENCE TO RELATED APPLICATION

This application claims the benefit of U.S. Provisional Application No. 62/019,313, filed Jun. 30, 2014, entitled PIPE-CONFORMING STRUCTURE, the entirety of which is incorporated by reference herein.

FIELD

The present disclosure relates generally to a pipe-conforming structure. More specifically, the present disclosure provides a pipe-conforming structure to reduce fiber optic cable damage and to reduce pipe-laying vessel modifications.

BACKGROUND

This section is intended to introduce various aspects of the art, which may be associated with exemplary embodiments of the present techniques. This discussion is believed to assist in providing a framework to facilitate a better understanding of particular aspects of the present techniques. Accordingly, it should be understood that this section should be read in this light, and not necessarily as admissions of prior art.

The assessment of pipelines in a production facility is an important aspect related to maintenance and operational concerns. Pipeline failures and other integrity issues may have an impact on production capacity, operational costs, and environmental factors, among other issues. Internal and external issues, such as material defects, external damage, or intrusions, may be the cause of integrity failures.

Visual inspection of a pipeline is one technique used to search for the existence of integrity failures. The visual inspection may include observing visible features, such as cracks, in the pipeline that may indicate potential distress or existing damage. Visual inspection may require an understanding of the type of cracks that may occur during normal operations as opposed to the type of cracks that may indicate pre-stress or distress in the pipeline. Thus, an experienced person who is accustomed to determining whether an issue is caused by normal wear or an integrity failure may conduct a visual inspection.

If visual inspection and/or monitoring is not feasible, or would be problematic for other reasons, the presence of an integrity failure may be identified by the use of fiber optic technology, among other methods. For example, fiber optic probes may be driven into the soil near the location of the pipeline, attached to the pipeline, or placed adjacent to the pipeline for the detection of integrity failures associated with the pipeline.

For pipelines in an offshore environment, such as in offshore oil and gas production, fiber optic cables may be attached to the pipeline to monitor for structural or functional issues associated with the pipeline. The fiber optic cable may be deployed during installation of a pipeline or deployed after the installation of the pipeline. Using temperature/acoustic vibrations sensing techniques, the fiber optic cable may detect leakage, ground movement, spans, and intrusions upon the pipeline. However, fiber optic cables may easily be damaged during the installation or placement of a pipeline.

SUMMARY

An exemplary embodiment described herein provides a pipe-conforming structure. The pipe-conforming structure includes a polymer material, wherein the polymer material is formed into a structure that is conformed to the shape of a pipe. The pipe-conforming structure also includes one or more optic fibers embedded within the polymer material.

Another exemplary embodiment provides a method for forming a pipe-conforming structure. The method includes forming a polymer material into a structure including an edge region and a center region, wherein the center region has a greater thickness than the edge region. The method also includes inserting one or more optic fibers into the polymer material.

Another exemplary embodiment provides a method for installing a pipe-conforming structure on a pipeline. The method includes disposing the pipe-conforming structure along an external length of the pipeline. The method also includes conforming the pipe-conforming structure to the shape of the pipeline and attaching the pipe-conforming structure to the pipeline.

DESCRIPTION OF THE DRAWINGS

The advantages of the present techniques are better understood by referring to the following detailed description and the attached drawings, in which.

DETAILED DESCRIPTION

Figure 1:
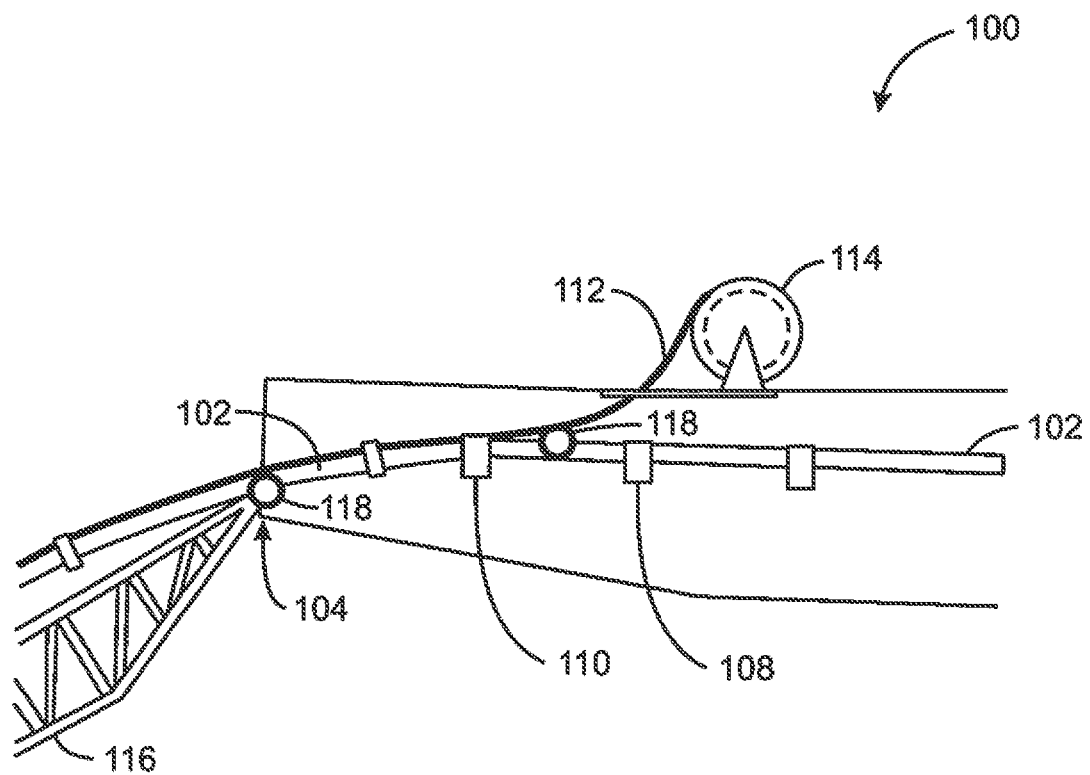
FIG. 1 is a drawing of a pipe-laying vessel including a cable installation station.

In the following detailed description section, specific embodiments of the present techniques are described. However, to the extent that the following description is specific to a particular embodiment or a particular use of the present techniques, this is intended to be for exemplary purposes only and simply provides a description of the exemplary embodiments. Accordingly, the techniques are not limited to the specific embodiments described below, but rather, include all alternatives, modifications, and equivalents falling within the true spirit and scope of the appended claims.

A pipe-laying vessel may be used in the construction of subsea infrastructure including pipelines for oil and natural gas developments, undersea geology, and underwater mining, among others. For oil and natural gas developments, the pipe-laying vessel may be used as a landing vessel for the assembly of pipes and later for the laying of a pipeline on the seabed or embedding the pipeline into the seabed. The S-lay method and the J-lay are examples of two types of techniques that can be implemented on the pipe-laying vessel for laying the pipeline at subsea levels. The S-lay method lays a suspended pipe from a stinger of a vessel to the seabed in the shape of an "S" configuration. The S-lay method may be implemented for laying offshore pipelines in relatively shallow waters of around 100-200 meters in depth and in deep waters of up to 2500 meters in depth. The J-lay method deploys a pipeline vertically into the water to form a "J" curve from the surface to the seabed. The J-lay method may be implemented for laying offshore pipelines in deep waters in a range of 400 to 3500 meters in depth.

An attachment station for attaching fiber optic cable to the pipeline before it is lowered into the sea may be located on the pipe-laying vessel. The fiber optic cable may be used to monitor the pipeline and the flow of its contents, leaks, ground movement, temperature changes, vibrations, and soil property changes, among others. The fiber optic cable may be attached near a top position of the pipeline for convenience of installation. However, other positions of the pipeline, e.g., bottom position of the pipeline or side positions, can be very useful from a monitoring standpoint. Attaching fiber optic cables without the use of a pipe-conforming structure in other positions can be costly or difficult, for example, requiring modifications to a pipe-laying vessel or possibly resulting in damage to the cable or retrofitting of an existing pipeline.

The pipe-laying vessel may include rollers that may be stationed along various points of the pipe-laying vessel, which are used to guide the pipeline and any attached fiber optic cable during assembly and installation. In particular, the rollers may restrain, bend, guide, and transport the pipeline and the fiber optic cable in a longitudinal direction. Without the pipe-conforming structure, the rollers may come into contact with the fiber optic cable during installation, which may damage the cable. For example, the fiber optic cable may be sensitive to pulling, bending, and crushing forces. Any such damage to the fiber optic cable without the pipe-conforming structure caused by the rollers may alter its characteristics to the extent that it needs to be replaced.

FIG. 1 is a drawing of a pipe-laying vessel 100 including a cable installation station. In particular, the pipe-laying vessel 100 provides an S-lay pipeline installation method for the laying of a pipeline 102. With the S-lay pipeline installation method, the pipeline 102 may be released over a stern 104 of the pipe-laying vessel 100 as it moves forward. The pipeline 102 may curve in a downward direction as it leaves the stern 104 and the pipe-laying vessel 100 to be lowered, for example, to a sea-floor or into a trench. As previously discussed with the S-lay method, the pipeline 102 may be in the form of an "S" shape as it is laid upon or embedded into the sea floor or trench.

With the S-lay method, a pipeline assembly may be substantially fabricated on board the pipe-laying vessel 100, which may include the necessary equipment required to fabricate the pipeline 102. In particular, the pipeline 102 may be initially formed using the pipe joints, which can be assembled in a horizontal working plane and welded together to form the pipeline 102.

During operation, the pipeline 102 may be subjected to moisture, chemicals, and other substances that may affect its integrity, thus, possibly leading to corrosion. To combat the effects of corrosion and other material failures, a protective coating may be applied over the surface of the pipeline 102. Thus, to protect the integrity of the fabricated pipeline 102, the pipe-laying vessel 100 may also include a pipe coating station 108. For example, the pipe coating station 108 may apply a first coating, e.g., a corrosion coating, and a second coating, e.g., concrete, to reduce any physical damage that may occur during the installation of the pipeline and during production operations.

The pipe-laying vessel 100 may include a fiber optic attachment station 110 for the attachment of a pipe-conforming structure 112 before the installation of the pipeline 102 into the seabed. The fiber optic attachment station 110 may include a reel 114 for the storage and de-spooling of the pipe-conforming structure 112 including one or more optic fibers, which fibers may be incorporated in a fiber optic cable. The reel 114 may be configured to release and direct the pipe-conforming structure 112 to come into contact with the pipeline 102. The fiber optic attachment station 110 may also be configured to mechanically attach the pipe-conforming structure 112 to the pipeline 102 using various physical attachment methods.

The pipe-conforming structure 112 may have a thin convex shape in order to conform to the shape of the pipeline 102 during attachment. As opposed to a tubular fiber optic cable, the conforming nature of the pipe-conforming structure may extend over a larger circumference of the pipeline 102 to cover multiple positions during the detection of integrity failures.

The thin convex shape of the pipe-conforming structure 112 may eliminate the need for modifications to a pipe-laying vessel 100. For example, with a tubular fiber optic cable, a stinger 116 of the pipe-laying vessel 100 may require modifications to attach the fiber optic cable to the bottom of the pipeline. As shown in FIG. 1, the stinger 116 is a slide used to guide the pipeline 102 from a horizontal position aboard the pipe-laying vessel 100 to a vertical position into the sea. The stinger 116 may be located near the rear of the pipe-laying vessel 100 to support the pipeline 102 and the attached pipe-conforming structure 112. Modifications to the stinger 116 may lead to additional costs and installation complexities. However, the conforming nature of the pipe-conforming structure 112 may reduce or eliminate modifications to the stinger 116, as the contoured profile may smoothly pass over current roller box designs.

The pipe-laying vessel 100 may include roller boxes 118 at various locations along the length of the pipeline 102, including near the pipe-conforming structure attachment station 110 and near the location of the stinger 116. The roller boxes 118 may support the load of the pipeline 102 while on the pipe-laying vessel 100 and during its installation into the seabed. Additionally, the roller boxes 118 located near the stinger 116 may aid in controlling of the bend radius for the pipeline 102 as it bends over the pipe-laying vessel 100 and is lowered into the sea. The roller boxes 118 may also be adapted to receive and support the pipe-conforming structure 112 during its attachment to the pipeline 102.

Although the roller boxes 118 may cause damage to a tubular fiber optic cable, the thin convex shape of the pipe-conforming structure 112 described herein may withstand the load forces. Thus, damage to the optic fibers of the pipe-conforming structure 112 may be reduced or eliminated based on its conforming structure.

The use of a pipe-conforming structure that has a smooth, conforming shape is not limited to subsea applications. Any number of on-shore applications may also benefit from the pipe-conforming structure, e.g., a pipe-conforming structure including a fiber optic cable, as discussed herein. The pipe-conforming structure may be especially beneficial for remote or buried pipelines, for which visual inspection is problematic. The use of the pipe-conforming structure has the same advantages for on-shore pipeline equipment, e.g., decreasing the need to modify the equipment for installation of the pipe-conforming structure on the pipeline 102.

Figure 2:
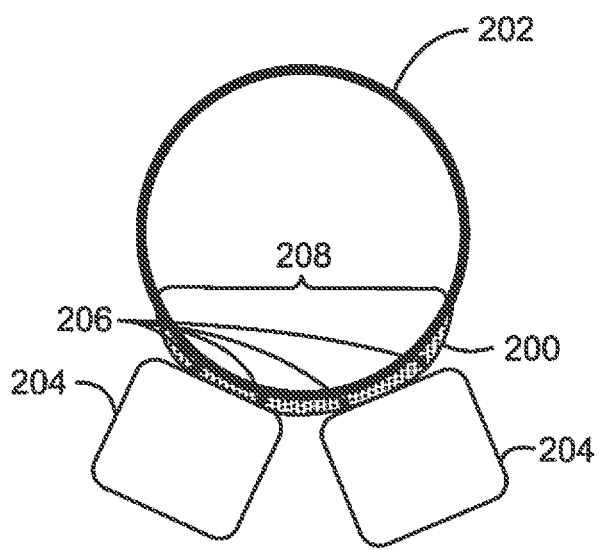
FIG. 2 is a cross-sectional view of a pipe-conforming structure attached to a bottom position of a pipeline.

FIG. 2 is a cross-sectional view of a pipe-conforming structure 200 attached to a bottom position of a pipeline 202. As shown in FIG. 2, the pipeline 202 may be situated upon rollers in roller boxes 204 oriented in a longitudinal direction and configured to support the pipeline 202 as it moves along a pipe-laying vessel, as described with respect to FIG. 1. In some embodiments, the rollers may be v-shaped, bi-conical, or any shape to support the pipeline 202. As the pipe-conforming structure 200 follows the profile or contour of the pipeline 202, it may rest on the rollers of the roller boxes 204 without damaging embedded components 206, such as optic fibers or fiber optic cables including one or more optic fibers. Embedded components 206 that may be useful are discussed further with respect to FIGS. 4A and 4B.

As shown in FIG. 2, the pipe-conforming structure 200 may be conformed to and attached to the bottom of the pipeline 202. In some embodiments, the pipe-conforming structure 200 may be attached using an attachment structure which may include an adhesive, a tape, one or more straps, or any combination of attachment methods to securely attach it to the pipeline 202. For example, the pipe-conforming structure 200 may be attached to the pipeline by a layer of epoxy, or other thermoset resin, placed between the pipeline and the pipe-conforming structure 200. Other types of adhesives may also be used, for example, a molten polymer, e.g., a hot melt adhesive, may be used to adhere the pipe-conforming structure 200 to the pipeline. The selection of an adhesive may be based on the coatings used on the pipeline. For example, if the outermost coating is an epoxy layer, then an epoxy based adhesive may be compatible. Similarly, a tape-based adhesive system, such as a double-sided tape, a solvent activated tape, a heat activated tape, or other tape systems may be used.

In some embodiments, other systems may be more useful for holding the pipe-conforming structure 200 to the pipeline 202. For example, a concrete coating over a pipeline 200 may make adhesion more problematic. A physical system may be used to hold the pipe-conforming structure 200 in place. The physical system may be based on straps installed at intervals that hold the pipe-conforming structure 200 to the pipeline 202.

The conforming nature of the pipe-conforming structure 200 may eliminate the need to make modifications to a pipe-laying vessel, such as a pipe-construction barge or on-shore pipe-laying equipment. Specifically, the pipe-conforming structure 200 may be configured into a particular shape so as conform to the shape of the pipeline 202. Accordingly, the pipe-conforming structure 200 may move over the rollers of the roller boxes 204 without damage. In particular, the thin convex shape of the pipe-conforming structure 200 can allow it to move over the rollers of the roller boxes 204 without bending or flexing that may cause functional damage to the embedded components 206.

In contrast to a single, tubular fiber optic cable, a pipe-conforming structure 200 mounted along the bottom of a pipeline 202 may allow for the detection of integrity failures along the sides of the pipeline 202 located in proximity to the bottom. This may occur since the shape of the pipe-conforming structure 200 covers a greater portion, or an arc 208 of the circumference of the pipeline 202, than a tubular fiber optic cable. In particular, the arc 208 of the pipeline 202 covered by the pipe-conforming structure 200 may cover an angle of the pipe circumference of between 30° and 180°, for example 100°, 120°, 160°, or more. Overall, the pipe-conforming structure 200 may enable monitoring the pipeline 202 across a large arc, thus enhancing the possibility of identifying integrity issues.

Figure 3:
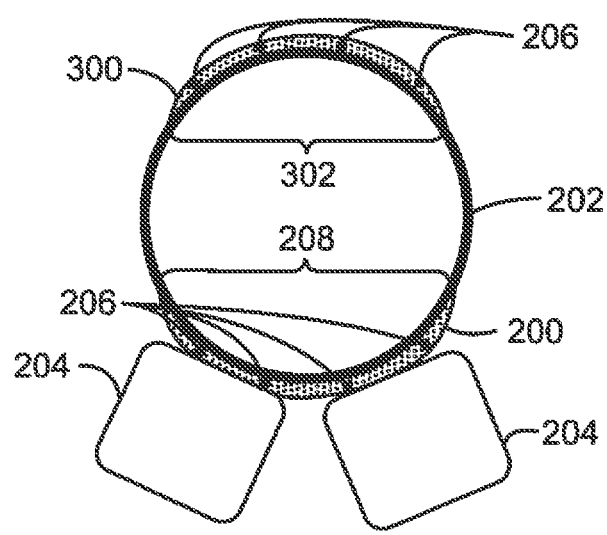
FIG. 3 is a cross-sectional view of a lower pipe-conforming structure attached to a bottom of a pipeline and an upper pipe-conforming structure attached to a top of the pipeline.

FIG. 3 is a cross-sectional view of a lower pipe-conforming structure 200 and an upper pipe-conforming structure 300 attached to a bottom and a top of a pipeline 202. Like numbers are as described with respect to FIG. 2. In some embodiments, only the upper pipe-conforming structure 300 may be attached to the top position of the pipeline 202.

The upper pipe-conforming structure 300, situated around an upper arc 302 of the circumference of the pipeline 202, may be used to monitor positions in close proximity to the top of the pipeline 202. Additionally, as shown in FIG. 3, a lower pipe-conforming structure 200 may be located near the bottom of the pipeline 202. This may facilitate the detection of leaks near the bottom and the positions in close proximity to the bottom. Thus, the conforming nature of the lower and upper pipe-conforming structures 200, 300 may eliminate the need to provide multiple separate fiber optic cables along various positions of the pipeline 202. Instead, the lower and upper pipe-conforming structures 200, 300 may cover enough of the circumference of the pipeline 202 to, for example, detect integrity failures at the top and bottom of the pipeline 202 and at positions there between. The upper-conforming structure 300 may also be used for monitoring of onshore or offshore vintage pipelines by easily gluing the conforming cable structure 300 to the pipeline 202. This may avoid the need to lift the existing pipelines as required for the case when strapping a tubular cable structure to a pipeline.

Figure 4A:
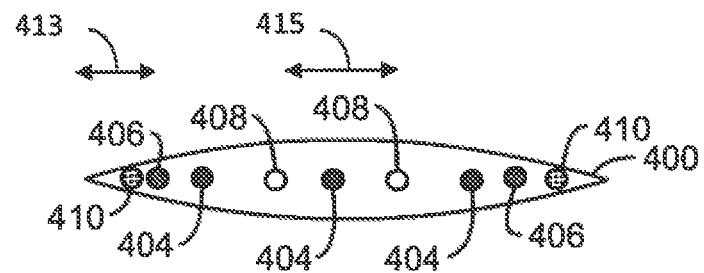
FIG. 4A is a cross-sectional view of a thin polymer structure.
Figure 4B:
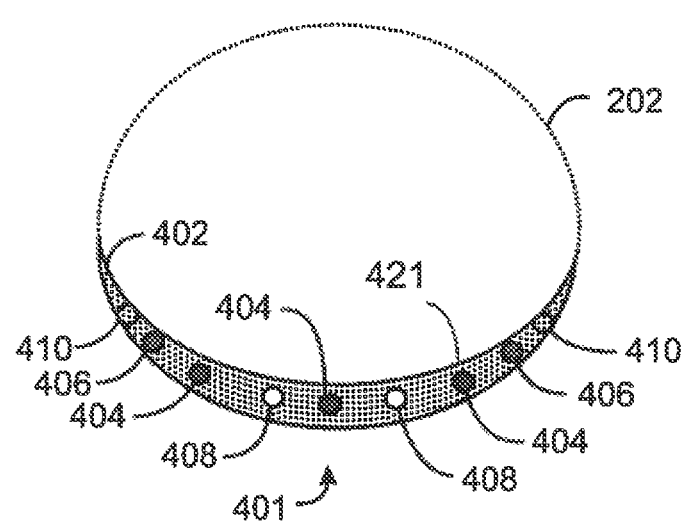
FIG. 4B is a cross-sectional view of a pipe-conforming structure after installation on a pipeline.

FIG. 4A is a cross-sectional view of a thin polymer structure 400. FIG. 4B is a cross-sectional view of a pipe-conforming structure 401 after installation on a pipeline 202. Like number items are as discussed with respect to FIG. 3.

As described herein, the pipe-conforming structure 401 may be formed from a polymer. The polymer material may include a high-density polyethylene (HDPE), a polyurethane, a polyamide, a polyvinyl chloride, a polyamide, or any number of other polymers. Since the use of a polymer may provide flexibility, the pipe-conforming structure 401 may be configured to conform to the shape of a pipeline. For example, the pipe-conforming structure 401 may be capable of conforming generally to the shape of the pipeline 202.

The pipe-conforming structure 401 may be formed using an extrusion method, such as pultrusion molding, as will be discussed in greater detail with respect to FIG. 5. The pultrusion molding technique may form a high-strength polymer material into a defined shape, such as the thin polymer structure 400, as shown in FIG. 4A. The structure may form a smooth, convex polymer structure 402 when it is conformed and attached to the pipeline via an attachment structure 421 such as an adhesive, as shown in FIG. 4B. During the extrusion, various items, such as one or more optic fibers included within a fiber optic cable 404 may be embedded within the length of the thin polymer structure 400. As described, the fiber optic cables 404 may be used to monitor a pipeline, for example, to monitor flow through the pipeline, integrity of the pipeline, and the like. Moreover, the polymer may act to protect the fiber optic cables 404 from environmental factors including seawater, corrosive fluids, or organisms, among others.

In addition to the fiber optic cables 404, other components may be embedded in the thin polymer structure 400 to aid in its structural integrity and capabilities. For example, the thin polymer structure 400 may include metal reinforcements 406, e.g., steel cables, to increase crack resistance, tensile strength, and stiffness.

Further, tubes 408, or any type of conduit for the flow of fluids, may be embedded in the thin polymer structure 400. For example, the tubes 408 may carry a heating fluid to heat or cool the pipeline to which the pipe-conforming structure 401 may be attached. This may be useful for controlling the formation of gas hydrates or assisting with other flow problems. In some embodiments, channels in the thin polymer structure 400 may be used as the tubes 408 for carrying fluid, reducing the need to install other conduits.

Additionally, electrical lines 410 may be embedded within the thin polymer structure 400. The electrical lines 410 may perform a number of functions. For example, the electrical lines 410 may be used to provide power to units along the pipeline, such as optical sensors. The electrical lines 410 may also provide communications between units, in addition to, or instead of, using the fiber optic cables. Further, the electrical lines 410 may be resistance lines that act as a heat source for the pipeline. For example, the electrical lines 410 may replace heat lost to the environment to aid in temperature stabilization or to melt hydrates. Accordingly, the thin convex polymer structure 400, along with any embedded components, make up the pipe-conforming structure 401 of the present disclosure.

Figure 5:
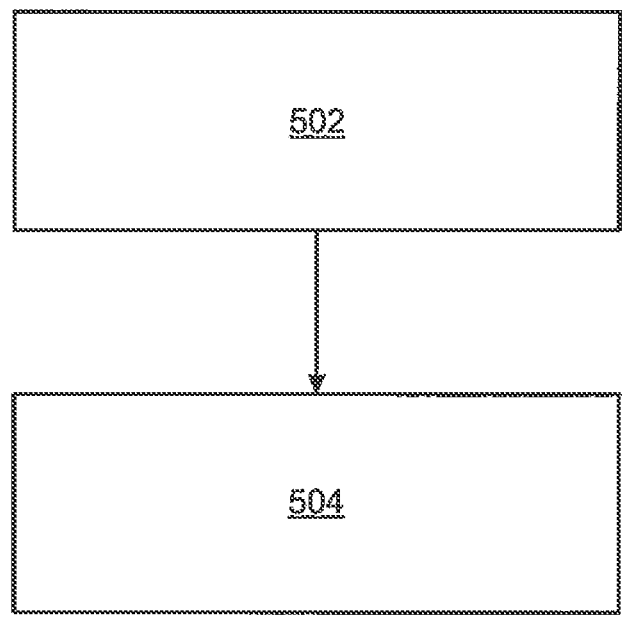
FIG. 5 is a process flow diagram of a method of forming a pipe-conforming structure.

FIG. 5 is a process flow diagram of a method of forming a pipe-conforming structure. An extrusion method may be utilized to form the pipe-conforming structure. The extrusion method may include the continuous shaping of a high-strength polymer using a die or mold to create a structure with a fixed cross-sectional profile. At block 502, a polymer material may be formed into a structure with a defined shape. For example, the present techniques may utilize a profile extrusion technique, such as pultrusion molding.

A pultrusion molding processing may involve extruding the polymer into a heated die, while evenly pulling a formed structure from the heated die. To form a structure, the pultrusion die may flow a melted plastic around die inserts to form channels in the die. Additionally, channels in the die may flow melted plastic directly around fiber optics, metal cables, tubes, electrical lines, and the like, to directly embed these components into the structure. The die may be configured to form the melted plastic into a particular shape as desired by the user, such as the shape shown in FIG. 4A. For example, the die may form the melted plastic into a shape with a center region 415 having a greater thickness (when viewed in cross-section) than the edge regions 413 that, when conformed to a pipeline, forms a thin convex structure. In certain embodiments, the maximum thickness of the center region 415 may be at most 30 mm or at most 25 mm or at most 15 mm (when viewed in cross-section). In certain embodiments, the pipe-conforming structure may be convex in shape, tapering in thickness in the edge region such that the edges of the pipe-conforming structure provide a substantially smooth transition with the pipewall. The pultrusion molding technique may supply a substantial degree of dimensional control while producing a continuous length with constant cross-sections along the length. At block 504, any remaining components not inserted during extrusion, such as optical fibers, may be inserted into channels molded in the polymer to create the pipe-conforming structure.

Figure 6:
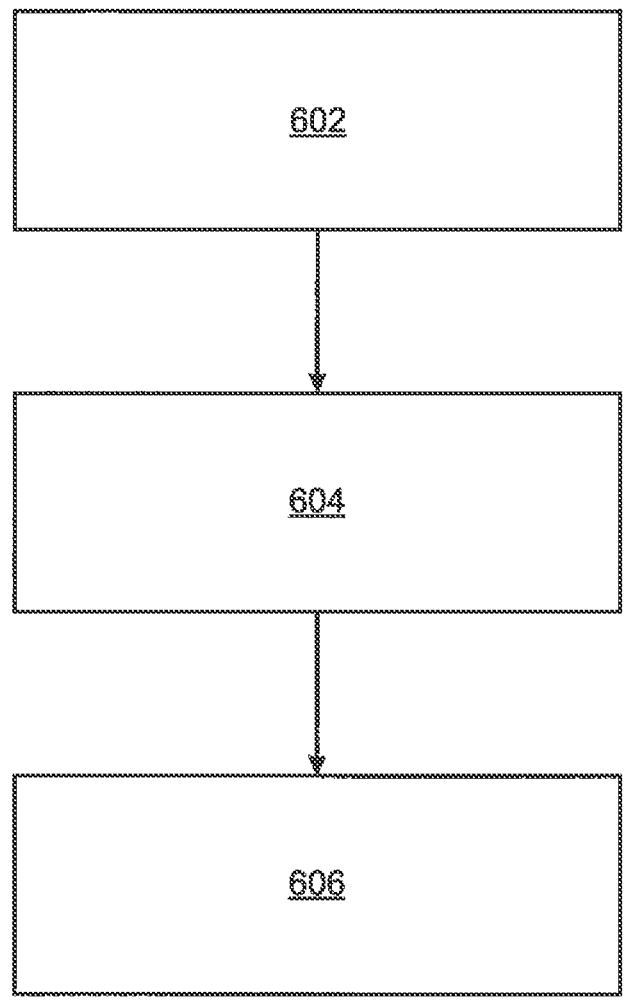
FIG. 6 is a process flow diagram of a method of installing a pipe-conforming structure on a pipeline.

FIG. 6 is a process flow diagram of a method of installing a pipe-conforming structure on a pipeline. The pipe-conforming structure may be used in conjunction with various applications, for example, during the production of hydrocarbons. At block 602, the pipe-conforming structure may be disposed along an external length of a pipeline. The pipe-conforming structure may be installed during pipeline fabrication and installation, or the pipe-conforming structure may be added to existing pipelines. At block 604, the pipe-conforming structure may be conformed to the shape of the pipeline. Through the use of a polymer, the pipe-conforming structure may exhibit certain properties that facilitate a degree of flexibility and conformity to accommodate the particular dimensions of the pipeline. After placing the pipe-conforming structure in proximity to the pipeline, at block 606, the pipe-conforming structure may be attached to the pipeline, for example, using the techniques discussed with respect to FIG. 2.

Fiber optic cables may be used to detect and locate pipeline integrity failures or monitor flow conditions for problems. However, tubular designs for fiber optic cables may lead to a number of problems during installation and may overlook issues located away from the tubular cable on the circumference of a pipeline. The present techniques provide a pipe-conforming cable designed and utilized for the reduction in the number of problems, including the reduction of cable damage during installation, the elimination of stinger and pipe-laying vessel modifications, and increased detection for pipeline integrity failures.

While the present techniques may be susceptible to various modifications and alternative forms, the exemplary embodiments discussed above have been shown only by way of example. However, it should again be understood that the techniques are not intended to be limited to the particular embodiments disclosed herein. Indeed, the present techniques include all alternatives, modifications, and equivalents falling within the true spirit and scope of the appended claims.

What is claimed is:

1. A method for installing a lower pipe-conforming structure on a pipeline, the method comprising:
    disposing the lower pipe-conforming structure along an external length of the pipeline, the lower pipe-conforming structure comprising a polymer material and one or more optic fibers embedded within the polymer material;
    conforming the lower pipe-conforming structure to the shape of the pipeline; and
    attaching the lower pipe-conforming structure to the pipeline proximate to the bottom of the pipeline, wherein the lower pipe-conforming structure covers an angle of a pipe circumference of between about 100° and about 180°.

2. The method of claim 1, wherein the lower pipe-conforming structure conforms to the shape of the pipeline during fabrication of the pipeline.

3. The method of claim 1, wherein the lower pipe-conforming structure conforms to the shape of the pipeline after installation of the pipeline.

4. The method of claim 1, wherein the attaching of the lower pipe-conforming structure comprises using an attachment structure selected from the group consisting of an adhesive layer, a tape layer, a strap, and any combination thereof.

5. The method of claim 1, further comprising laying the pipeline with the attached lower pipe-conforming structure from a pipeline construction vessel.

6. The method of claim 1, wherein the polymer material is selected from the group consisting of high-density polyethylene (HDPE), polyurethane, polyamide, polyvinyl chloride (PVC), polyamide, and any combination thereof.

7. The method of claim 1, wherein the lower pipe-conforming structure comprises metal reinforcements embedded within the polymer material.

8. The method of claim 1, wherein the lower pipe-conforming structure comprises tubes embedded within the polymer material, wherein the tubes are configured to flow fluids.

9. The method of claim 1, wherein the lower pipe-conforming structure comprises electrical lines embedded within the polymer material.

10. The method of claim 9, wherein the electrical lines provide electrical power.

11. The method of claim 1, wherein the lower pipe-conforming structure covers an angle of the pipe circumference of between about 120° and about 180°.

12. The method of claim 1, further comprising:
forming the polymer material into a structure comprising an edge region and a center region, wherein the center region has a greater thickness than the edge region; and
inserting the one or more optic fibers into the polymer material.

13. The method of claim 12, wherein forming the polymer material comprises extruding the polymer material using a pultrusion molding technique.

14. The method of claim 13, further comprising inserting one or more tubes into the polymer material during the pultrusion molding technique.

15. The method of claim 13, further comprising inserting one or more electrical lines into the polymer material during the pultrusion molding technique.

16. The method of claim 13, further comprising inserting one or more metal reinforcements into the polymer material during the pultrusion molding technique.

17. The method of claim 12, wherein the polymer material is formed into a structure that is convex in shape, tapering in thickness in the edge region such that the edges of the lower pipe-conforming structure provide a substantially smooth transition with the pipeline.

18. The method of claim 17, wherein the center region has a maximum thickness of at most 30 millimeters.

19. The method of claim 1, further comprising:
disposing an upper pipe-conforming structure along an external length of the pipeline;
conforming the upper pipe-conforming structure to the shape of the pipeline; and
attaching the upper pipe-conforming structure to the pipeline proximate to the top of the pipeline.

20. The method of claim 19, wherein the upper pipe-conforming structure comprises a polymer material and one or more optic fibers embedded within the polymer material.

* * * * *